United States Patent
Baumann et al.

(10) Patent No.: US 6,317,309 B1
(45) Date of Patent: *Nov. 13, 2001

(54) METHOD AND DEVICE FOR THE CONTROLLED DRIVING OF A PROPORTIONALLY OPERATED MAGNETIC VALVE

(75) Inventors: Dieter Baumann, Moeglingen; Hardy Haas, Markgroeningen; Klaus-Dieter Leimbach, Moeglingen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/108,895

(22) Filed: Jul. 1, 1998

(30) Foreign Application Priority Data

Jul. 1, 1997 (DE) .............................................. 197 27 945

(51) Int. Cl.$^7$ .................................................... F16K 31/06
(52) U.S. Cl. ............................................ 361/160; 361/170
(58) Field of Search ..................................... 361/152–156, 361/160, 170

(56) References Cited

U.S. PATENT DOCUMENTS

| 3,857,081 | * | 12/1974 | Gebelein, Jr. | 335/215 |
|---|---|---|---|---|
| 4,370,604 | * | 1/1983 | Griffin | 361/152 |
| 4,485,424 | * | 11/1984 | Niwa et al. | 361/152 |
| 4,737,882 | * | 4/1988 | D'Onofrio | 361/154 |
| 4,825,333 | * | 4/1989 | Cllive et al. | 361/154 |
| 5,530,614 | * | 6/1996 | Lang et al. | 361/154 |
| 5,703,750 | * | 12/1997 | Kim et al. | 361/160 |
| 5,717,562 | * | 2/1998 | Antone et al. | 361/155 |
| 5,724,223 | * | 3/1998 | Feuser et al. | 361/152 |
| 5,915,667 | * | 6/1999 | Kim et al. | 361/152 |

* cited by examiner

Primary Examiner—Fritz Fleming
(74) Attorney, Agent, or Firm—Kenyon & Kenyon

(57) ABSTRACT

A method and a device for regulated actuation of a proportionally operated solenoid valve are described. The described method and the described device are distinguished by the fact that the actuation of the solenoid valve takes place under consideration for the regulating processes which were necessary prior to such time in order to operate the solenoid valve according to specifications.

14 Claims, 2 Drawing Sheets

METHOD AND DEVICE FOR THE CONTROLLED DRIVING OF A PROPORTIONALLY OPERATED MAGNETIC VALVE

FIELD OF THE INVENTION

The present invention relates to a method and a device for the regulated actuation of a proportionally operated solenoid valve.

Such solenoid valve can, for example, be a 2/2 seat valve employed in automotive ABS hydraulic assemblies for pressure modulation.

BACKGROUND INFORMATION

2/2 seat valves are valves with two inlets and/or outlets and two switch positions, the inlets or outlets being joined to each other in one (open) switch position and separated in the other (closed) switch position. In the case of the valves to be considered in greater detail here, the valves may be monostable valves, i.e., valves which in the de-energized condition are either open or closed.

The opening or closing of solenoid valves is accomplished by the activation or deactivation of an (electro-) magnet provided in the valve.

The activation and deactivation of the electromagnet, more precisely, the energizing of the coil of the electromagnet, results in the movement, i.e., the attraction or the release of an armature which is connected with the closure element of the valve and thereby moves the closure element with it.

Although valves of this kind originally were provided "only" to switch back and forth between the two switch positions, they recently have also been operated proportionally. Thus they are operated so that the closure element assumes an intermediate position between the switch positions, or they are opened and closed in rapid sequence for equal or varied periods of time so that in the process a condition corresponding to a stationary intermediate position of the closure element develops.

One possible application of this type of valve actuation is the setting of a defined differential pressure across the valve (for example in the aforementioned ABS hydraulic assemblies). Since the dynamic response of the valve, however, is strongly nonlinear, this is fairly difficult to arrange.

Regulation concepts which have been developed in the past for the modulation of pressure using the aforementioned valves are based on linear pressure regulation systems with a pre-control system with a differential pressure working point being set by the pre-control system around which the regulation takes place.

The basic design of a regulation system of this kind is illustrated in FIG. 3.

The valve which is to be actuated in the arrangement per FIG. 3 is designated with reference number 1 and the regulating circuit through which the valve is to be actuated is designated with reference number 2. Regulating circuit 2 includes pre-control unit 21 and regulating unit 22.

The valve characteristic is stored in pre-control unit 21. As a result, pre-control unit 21 is able, depending on a target differential pressure ($\Delta P_{target}$) which is supposed to develop above the valve, to generate a control signal through which valve 1 normally is actuated in such manner that the actual differential pressure ($\Delta P_{actual}$) that develops across the valve corresponds to the target differential pressure or at least approaches it relatively closely. If needed, existing deviations between the target differential pressure and the actual differential pressure are compensated by regulating unit 22. Regulating unit 22 generates, on the basis of the difference between the target differential pressure and the actual differential pressure, a regulating signal which is summed with the control signal generated by pre-control unit 21.

Because the actual differential pressure which develops above valve 1 approaches relatively closely the target differential pressure through pre-control unit 21 alone, regulating unit 22 can be a linearly functioning regulating unit and accordingly be of relatively simple construction; through pre-control unit 21, a tentative operating point develops around which linear regulation can take place.

Experience shows that regulating circuit 2, despite its apparently good suitability for valve actuation, at times is not able to bring the actual differential pressure quickly, precisely, and lastingly to the target differential pressure. The cause of this is in particular the strong dependency of the valve characteristic on temperature.

With increasing temperature of the coil of the electromagnet of valve 1 and conditions unchanged otherwise, the current flowing through the coil decreases and, as a result, the force exerted on the closure element of the valve also decreases and the closure element can no longer withstand relatively great pressure differentials.

This effect can be compensated up to a certain degree by regulating unit 22. At greater temperature fluctuations, however, special measures are required for the elimination of these effects.

The effects elicited by temperature fluctuations can be compensated by providing a secondary current regulation system. In this case, a current-regulating unit (not shown in FIG. 3), the task of which is to regulate the (actual) current flowing through the valve to the particular target current, is inserted between valve 1 and regulating circuit 2.

By this means valve 1 can be operated according to specifications independently of temperature. However, provision of a secondary current control system comes at a considerable technological cost. This applies especially for determining the actual current flowing through the valve (conversion from a voltage drop which develops across a calibrated precision resistor, more or less frequent adjustment of the measuring device, etc.).

SUMMARY

According to an example embodiment of the present invention, a method and device are provided in which temperature-related false actuations of the valve can be reliably prevented in a simple manner.

According to the present invention, solenoid valve actuation takes place with consideration for the regulating processes which were necessary prior to such time in order to operate the solenoid valve according to specifications; and a regulating circuit is provided which is designed to perform the actuation of the solenoid valve with consideration for the regulating processes which were necessary prior to such time in order for the solenoid valve to be operated according to specifications.

The measures suggested are based on the insight that the conditions prevailing at the valve can be deduced from the regulating activity which is required to bring an actual value which develops at a solenoid to a specified target value.

By this means, adaptive solenoid valve actuation can be performed which is adequate, without additional sensors and measuring devices, for determining the parameters the influence of which must be eliminated.

Such adaptation can, for example, be an adaptation of the characteristic which takes place during the actuation of the valve (on-line) and/or a shift of the operating point based thereon, the nature and extent of such shift depending on the conditions prevailing at the valve at a particular time.

Such a shift of the operating point has the special advantage that independently of the conditions prevailing at the valve, the differences which develop between actual and target values—to the extent any such differences exist—are always only relatively small regardless of the conditions prevailing at the valve and accordingly can be brought to the point of completely disappearing by a regulating unit with relatively simple construction (linear operation).

The secondary current regulation utilized in the related art becomes unnecessary.

A method and a device were therefore found through which false actuations of the valve associated with conditions at the valve which change with time can be reliably prevented in a simple manner.

DETAILED DESCRIPTION

The solenoid valve, actuation of which is described in greater detail below, is the 2/2 seat valve referred to and described in the beginning. The application of the present invention, however, is not limited to the actuation of solenoid valves of this type. For example, it may be used for proportionally operated solenoid valves of any kind.

The valve in the present example under consideration is to be actuated so that a predetermined differential pressure develops across it. Also in this respect, however, there is no limitation. The present invention can also be used if some other variable rather than the pressure differential which develops across the valve is to be brought to a certain target value through the actuation.

Through the described valve actuation system, dependency of the pressure differential upon the temperature of the valve coil is taken into account. Basically the valve control system can be adapted in the manner described below to any other conditions.

Figure 1:
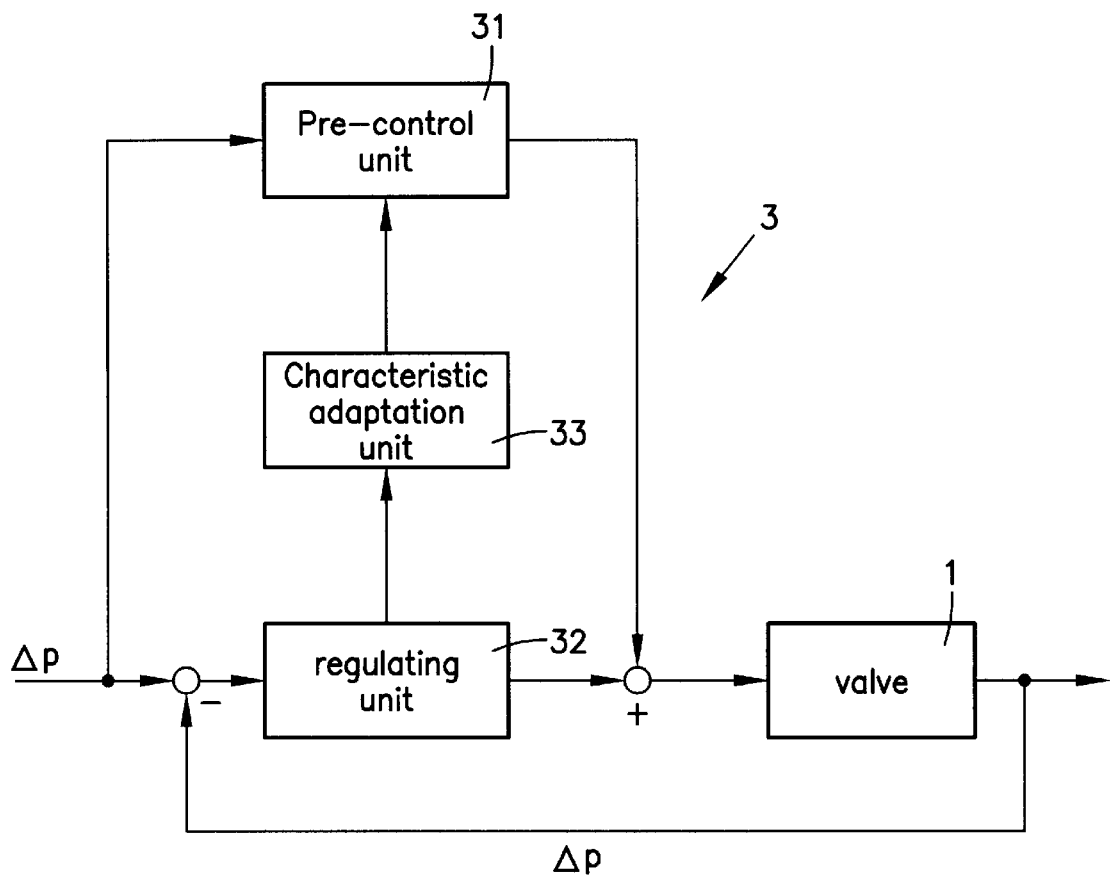
FIG. 1 shows an example embodiment of the arrangement according to the present invention for regulated actuation of a proportionally operated solenoid valve.

An example embodiment of the regulating circuit for actuation of the valve is illustrated in FIG. 1; the valve to be actuated is designated in the figure with reference number 1 (in order to correspond to valve 1 in FIG. 3) and the regulating circuit which is to actuate it is designated with reference number 3.

Regulating circuit 3 includes a pre-control unit 31, a regulating unit 32, and a characteristic adaptation unit 33.

Figure 3:
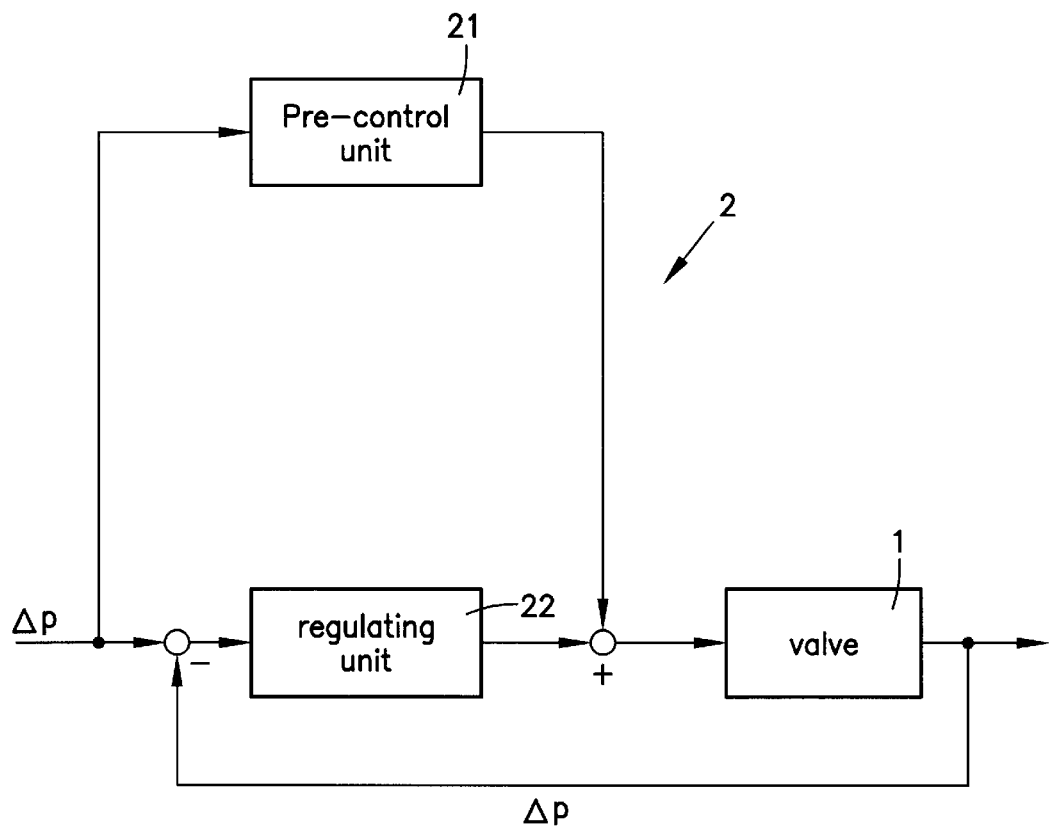
FIG. 3 shows a conventional arrangement for regulated actuation of a proportionally operated solenoid valve.

Pre-control unit 31 corresponds to pre-control unit 21 according to FIG. 3. It also stores a valve characteristic with consideration of which a control signal for actuation of valve 1 is generated. Nevertheless, the valve characteristic is not stored in a fixed manner, but rather can be changed (even during operation) by characteristic adaptation unit 33 or can be caused by it to be changed or can be replaced by any other valve characteristic. The control signal generated by pre-control unit 31 is generated so that the actual differential pressure across valve 1 ($\Delta P_{actual}$) corresponds to or at least approximates a predetermined target differential pressure ($\Delta P_{target}$).

Any deviations which might be present between the target differential pressure and the actual differential pressure are compensated through regulating unit 32. Based on the difference between the target differential pressure and the actual differential pressure, regulating unit 32 generates a regulating signal which is summed with the control signal generated by pre-control unit 31.

Regulating circuit 3, as mentioned above, is designed so that, only with the use of the control signal generated by pre-control unit 31, the actual differential pressure which develops across valve 1 corresponds to or closely approximates the target differential pressure. However, since the valve characteristic is strongly dependent on the temperature of the valve coil, the desired valve actuation is not always achievable.

To avoid this, characteristic adaptation unit 33 is provided in the example embodiment according to FIG. 1. Regulating unit 32 transmits data to characteristic adaptation unit 33 which represents the integral-action component of regulation by regulating unit 32. The integral-action component is used by the characteristic adaptation unit to adapt the valve characteristic stored in pre-control unit 31 to the changing conditions. The connections between the integral-action component of regulating unit 32 and valve characteristic adaptation is known to the characteristic adaptation unit 33; they can be determined empirically or can be approximated from theoretical considerations and are stored in characteristic adaptation unit 33 in the form of a table, a characteristic diagram, or a conversion formula.

Provision of characteristic adaptation unit 33 and its design, function, and mode of action are based on the insight that it is the integral-action component of regulation by regulating unit 32 which compensates the characteristic changes caused by temperature influences.

By using the integral-action component to adapt the valve characteristic stored in pre-control unit 33, the actual differential pressure which develops above valve 1 can be brought into agreement with the target differential pressure through pre-control unit 31 alone and independently of the temperature at a given time or can in any case be brought very close to it.

Therefore relatively small differences at most—if any at all—between the actual differential pressure and the target differential pressure are compensated by regulating unit 31. For this reason, a linearly operating and thus relatively simple regulating unit 32 can be utilized; however, any other regulating unit can also be used.

In cases in which the object is not, or in any case is not only, to compensate stationary regulating errors (for example those based on temperature-related changes in the valve characteristic), any other components of regulation (derivative component, proportional component, etc.) can be taken into consideration as alternatives to or additions to the integral-action component of regulation by regulating unit 32. It also does not necessarily have to be a characteristic which is adapted by characteristic adaptation unit 33; on the contrary, there are any desired number of parameters and relationships which are significant for the actuation of the valve and can be subjected to adaptation.

Figure 2:
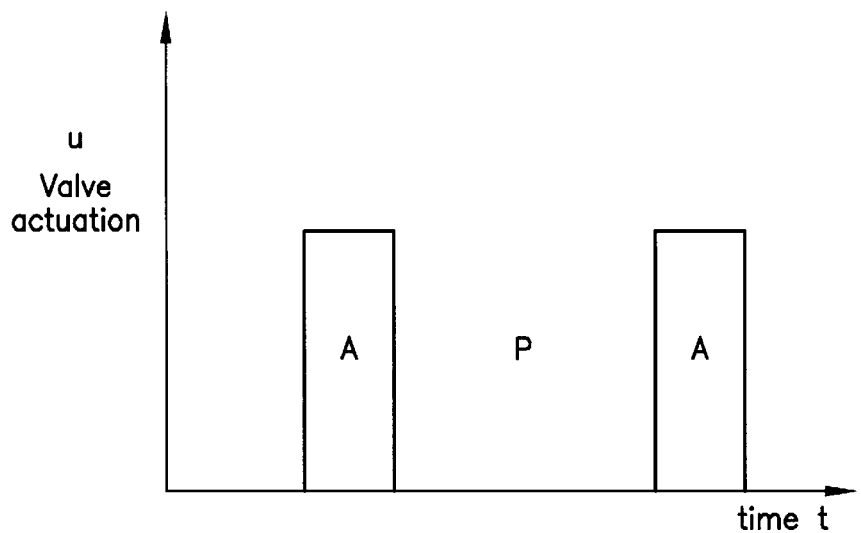
FIG. 2 shows an example of graphical representation of the operating and pause phases in the solenoid valve actuation.

At least at times, a temperature curve estimate or a characteristic adaptation based thereon can be performed as a supplement or an alternative. This proves to be advantageous, for example, when—but undoubtedly not only when—as illustrated in FIG. 2, active phases A alternate with relatively longer inactive phases, i.e., intermediate pauses P. In this case the characteristic adaptation described above can be performed during the active phases, and a characteristic adaptation based on a temperature curve estimate can be performed during the pauses.

In the case of the temperature curve estimate, the amount by which valve temperature drops during a given pause P is estimated. If the valve is placed in the active state again after a pause P, pre-control unit 31 can from the beginning of each active phase A refer back to a valve characteristic which is adapted to the presumably prevailing conditions. The time from the beginning of a particular active phase to the point at which the pressure differential regulation is functioning optimally adapted to the given conditions, can by this means be reduced to a minimum.

The valve temperature to be estimated depends among other things on the initial temperature from which point the cooling takes place, on the ambient temperature, and on the length of the cooling time. The relationships between valve temperature and the aforementioned parameters are determined empirically or are calculated as approximations based on theoretical considerations and are stored in characteristic adaptation unit 33 in the form of tables, characteristic curves, or formulas.

The initial temperature is the temperature at the end of each active phase A and can be determined from the adapted valve characteristic with which the pre-control unit is working at such point in time.

As can be seen from the above discussion, "only" allocations and/or calculations must be performed in characteristic adaptation unit 33; the characteristic adaptation unit can therefore be implemented in the form of software and thus with minimal technological expenditure.

Independent of this, the practical implementation of characteristic adaptation unit 33 proves to be considerably more simple than the practical realization of the secondary current regulation which has been used in the past in place of characteristic adaptation.

It is possible through the method and the device according to the present invention to reliably and in a simple manner prevent false actuations of the valve resulting from conditions at the valve which change with time.

What is claimed is:

1. A method for regulating actuation of a proportionally operated solenoid valve, comprising the steps of:
   determining regulating processes that were required at a time prior to a time of actuation to operate the valve according to a specification;
   adapting a characteristic of the valve as a function of at least the regulating processes that were required at the time prior to the time of actuation to operate the valve according to the specification; and
   actuating the valve as a function of at least the adapted characteristic.

2. The method according to claim 1, further comprising the steps of:
   determining the characteristic of the valve;
   determining prevailing conditions; and
   adapting the actuation of the valve as a function of at least the characteristic and the prevailing conditions.

3. The method according to claim 1, further comprising the step of:
   adapting the characteristic to the prevailing conditions; and
   adapting the characteristic as a function of at least regulating processes that were required at the time prior to the adapting of the characteristic in order to operate the valve according to the specification.

4. The method according to claim 2, further comprising the step of:
   adapting the characteristic to the prevailing conditions as a function of an estimate of the prevailing conditions.

5. The method according to claim 1, wherein the step of adapting the characteristic of the valve includes adapting the characteristic of the valve as a function of temperature.

6. A device for regulating actuation of a proportionally operated solenoid valve, comprising:
   a pre-control unit coupled to the valve, the pre-control unit setting an operating point of the valve; and
   a regulating control unit providing information to the pre-control unit, the information relating to regulating processes that were required at a time prior to a time of actuation to operate the valve according to a specification,
   wherein the pre-control unit adapts the operating point as a function of at least the information.

7. The device according to claim 6,
   wherein the operating point is dependent on at least prevailing conditions, and
   wherein the regulating unit performs linear regulation of the valve as a function of the operating point.

8. The device according to claim 7, wherein the pre-control unit operates as a function of a varying valve characteristic.

9. The device according to claim 8, further comprising:
   a characteristic adaptation unit adapting the valve characteristic to the prevailing conditions.

10. The device according to claim 9, wherein the regulating circuit determines the prevailing conditions as a function of an integral-action component of regulation by the regulating unit.

11. The device according to claim 9 wherein the prevailing conditions are determined by estimation.

12. The device according to claim 6, wherein the pre-control unit adapts the operating point as a function of a temperature of the valve.

13. A method for regulating actuation of a proportionally operated solenoid valve, comprising:
   determining a regulating process that was required at a time prior to a time of actuation to operate the valve according to a specification;
   storing a characteristic curve of the valve;
   adapting a characteristic curve of the valve as a function of at least the regulating process that was required at the time prior to the time of actuation to operate the valve according to the specification;
   storing the adapted characteristic curve of the valve; and
   actuating the valve as a function of at least the adapted characteristic curve.

14. The method according to claim 13, wherein the step of adapting the characteristic of the valve includes adapting the characteristic curve of the valve as a function of a temperature of the valve.

* * * * *